US012631151B2

(12) United States Patent
Dober et al.

(10) Patent No.: US 12,631,151 B2
(45) Date of Patent: May 19, 2026

(54) METHOD OF OPERATING A HYDROGEN INTERNAL COMBUSTION ENGINE

(71) Applicant: PHINIA DELPHI LUXEMBOURG SARL, Belvaux (LU)

(72) Inventors: Gavin Dober, Luxembourg (LU); Walter Piock, Garnich (LU)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/868,288

(22) PCT Filed: May 17, 2023

(86) PCT No.: PCT/EP2023/063332
§ 371 (c)(1),
(2) Date: Nov. 22, 2024

(87) PCT Pub. No.: WO2023/227450
PCT Pub. Date: Nov. 30, 2023

(65) Prior Publication Data
US 2025/0341191 A1 Nov. 6, 2025

(30) Foreign Application Priority Data
May 23, 2022 (GB) ..................................... 2207529

(51) Int. Cl.
*F02D 19/02* (2006.01)
*F02D 35/02* (2006.01)
(Continued)

(52) U.S. Cl.
CPC ......... *F02D 19/024* (2013.01); *F02D 35/021* (2013.01); *F02D 35/027* (2013.01);
(Continued)

(58) Field of Classification Search
CPC .... F02D 19/024; F02D 35/021; F02D 35/027; F02D 41/0027; F02D 41/2432; F02D 41/3094; F02D 41/402; F02D 2041/389
See application file for complete search history.

(56) References Cited

U.S. PATENT DOCUMENTS 6,675,748 B2 * 1/2004 Ancimer ............. F02D 19/0694 123/526
6,947,830 B1 * 9/2005 Froloff ................ F02D 41/3076 701/111
(Continued)

FOREIGN PATENT DOCUMENTS

AU 2011291406 A1 * 3/2013 .............. F02B 43/10
AU 2016204033 A1 * 1/2017
(Continued)

OTHER PUBLICATIONS

International Search Report for PCT/EP2023/063332 dated Sep. 12, 2023, 4 pages.
(Continued)

*Primary Examiner* — Hung Q Nguyen
(74) *Attorney, Agent, or Firm* — WARNER NORCROSS + JUDD LLP

(57) ABSTRACT

A method of operating a hydrogen internal combustion engine having at least one cylinder with an intake valve and a direct injector for injecting hydrogen fuel directly into the cylinder. The method comprises performing a plurality of hydrogen fuel injections before an ignition during an engine cycle, wherein a first injection, with a first injection amount $m_1$ and a first injection time $t_1$ as first injection parameters, is performed before the intake valve is closed and a second injection, with a second injection amount $m_2$ and a second injection time $t_2$ as second injection parameters, is performed by the direct injector after the intake valve has been
(Continued)

closed and before an ignition is performed. The method further comprises performing an adjustment process.

13 Claims, 2 Drawing Sheets

(51) Int. Cl.

| | |
|---|---|
| ***F02D 41/00*** | (2006.01) |
| ***F02D 41/24*** | (2006.01) |
| ***F02D 41/30*** | (2006.01) |
| ***F02D 41/40*** | (2006.01) |
| *F02D 41/38* | (2006.01) |

(52) U.S. Cl.

CPC ..... *F02D 41/0027* (2013.01); *F02D 41/2432* (2013.01); *F02D 41/3094* (2013.01); *F02D 41/402* (2013.01); *F02D 2041/389* (2013.01)

(56) References Cited

U.S. PATENT DOCUMENTS

| | | | | |
|---|---|---|---|---|
| 7,117,830 | B1 * | 10/2006 | Boyer | F02D 19/022 123/295 |
| 9,399,968 | B2 * | 7/2016 | Glugla | F02D 35/027 |
| 11,156,181 | B1 | 10/2021 | Alger et al. | |
| 11,635,046 | B1 * | 4/2023 | Klingbeil | F02D 19/10 261/19 |
| 2002/0078918 | A1 | 6/2002 | Ancimer et al. | |
| 2005/0000485 | A1 * | 1/2005 | Kuo | F02D 35/023 123/299 |
| 2010/0318284 | A1 * | 12/2010 | Surnilla | F02P 5/1506 123/527 |
| 2011/0144893 | A1 * | 6/2011 | Rollinger | F02D 41/008 701/111 |
| 2014/0331642 | A1 * | 11/2014 | Dearth | F02D 19/0647 60/273 |
| 2014/0331668 | A1 * | 11/2014 | Bidner | F02M 26/36 60/274 |
| 2015/0059686 | A1 | 3/2015 | Glugla et al. | |
| 2015/0167576 | A1 * | 6/2015 | Glugla | F02D 41/405 123/295 |
| 2016/0017818 | A1 * | 1/2016 | Miyata | F02D 41/3094 701/103 |
| 2016/0187219 | A1 * | 6/2016 | Bizub | G01L 23/221 702/191 |
| 2020/0063666 | A1 * | 2/2020 | Yamamoto | F02D 19/087 |
| 2020/0318570 | A1 * | 10/2020 | Hampson | F02D 35/028 |
| 2021/0404372 | A1 * | 12/2021 | Klingbeil | F02D 41/401 |

FOREIGN PATENT DOCUMENTS

| | | | | | |
|---|---|---|---|---|---|
| CA | 2799952 | A1 | * | 3/2013 | F02M 21/0284 |
| CN | 103597186 | A | * | 2/2014 | F02D 41/1446 |
| CN | 110552805 | A | | 12/2019 | |
| JP | 2018188990 | A | * | 11/2018 | F02D 19/0644 |
| WO | 2001059285 | A2 | | 8/2001 | |
| WO | WO-2007085897 | A1 | * | 8/2007 | F02D 41/18 |
| WO | WO-2012155122 | A2 | * | 11/2012 | F02D 41/3035 |
| WO | WO-2013075234 | A1 | * | 5/2013 | F02M 43/00 |
| WO | 2014094148 | A1 | | 6/2014 | |
| WO | WO-2015173937 | A1 | * | 11/2015 | F02D 41/34 |

OTHER PUBLICATIONS

Machine assisted English translation of CN110552805A obtained from <https://patents.google.com/patent> on Nov. 18, 2024, 6 pages.

* cited by examiner

METHOD OF OPERATING A HYDROGEN INTERNAL COMBUSTION ENGINE

CROSS-REFERENCE TO RELATED APPLICATIONS

This application is the U.S. National Stage of International Application No. PCT/EP2023/063332 filed on 17 May 2023, which claims priority to and all advantages of United Kingdom Application No. 2207529.5 filed on 23 May 2022, the contents of which are incorporated herein by reference.

TECHNICAL FIELD

The invention relates to a method of operating a hydrogen internal combustion engine.

BACKGROUND ART

With the increasing demand to reduce $CO_2$ emissions from road vehicles, alternatives to traditional internal combustion engines like Diesel or gasoline engines have been developed. One option are electric vehicles, mostly powered by Li-ion batteries or by fuel cells, in which the chemical energy of hydrogen and oxygen is converted into electric energy. Another option are hydrogen internal combustion engine (HICE) vehicles. These represent, in principle, a fast route to eliminate $CO_2$ from powertrains, since the HICE is basically a modification of a conventional diesel or gasoline engine. In a HICE, hydrogen ($H_2$) is used as a fuel and burned with oxygen, the reaction product being water. Hydrogen is typically premixed with air and then positively ignited inside the cylinder with a spark plug. A huge challenge in the operation of HICEs is that hydrogen has an extremely low ignition energy compared to carbon-based fuels, thus leading to a high risk of abnormal combustion, i.e., pre-ignition. If the hydrogen fuel is mixed with the air outside the engine, using a manifold injector or port injector, there is a significant risk of a pre-ignition early in the engine cycle, e.g., before the intake valve is closed, which leads to backfire and can damage the intake manifold side of the engine. Another risk is a pre-ignition after the intake valve has been closed, which can lead to extremely high in-cylinder pressures, which can break the engine.

One option to alleviate these problems is direct injection of the fuel, which allows injection only after the intake valve has closed. This prevents backfire and can reduce the pre-ignition risk. In general, later injection timing reduces the risk for abnormal combustion but also reduces the homogeneity of the fuel-air mixture, since there is less time for a homogeneous mixture to form before the combustion starts. Early injection, on the other hand, allows for more time for the fuel and air to mix prior to combustion, leading to a more homogeneous mixture. A homogeneous mixture increases the combustion efficiency and reduces harmful emissions formation, mostly nitrous gases ($NO_x$) that can be generated during the combustion as $N_2$ reacts with $O_2$.

Technical Problem

It is thus an object of the present invention to ensure reliable and efficient operation of a hydrogen internal combustion engine.

This problem is solved by a method according to claim 1 and by an engine system according to claim 13.

General Description of the Invention

The invention provides a method of operating a hydrogen internal combustion engine having at least one cylinder with an intake valve and a direct injector for injecting hydrogen fuel directly into the cylinder. The engine can in particular be an engine of an automotive vehicle, e.g., a car, but could be any other kind of engine. The hydrogen internal combustion engine is adapted to burn hydrogen fuel with oxygen to generate mechanical energy. In the following, the terms "hydrogen fuel", "hydrogen" and "fuel" are used synonymously, unless otherwise stated. "Hydrogen fuel" in this context refers to a gaseous fuel that comprises at least 90%, preferably at least 95%, more preferably at least 98%, of hydrogen in elementary form, i.e., $H_2$. The engine comprises at least one cylinder, but usually may comprise a plurality of cylinders. It is understood that a movable piston is disposed in the cylinder, which piston is in turn connected to a crankshaft. The engine may in particular be a four-stroke engine but could also be a two-stroke engine. Each cylinder has an intake valve, through which it communicates with an intake port, intake duct or intake manifold. In case of a two-stroke engine, the intake valve could also be formed by the piston which opens and closes the intake port, depending on its position. Normally, the cylinder also has an exhaust valve through which it communicates with an exhaust port, exhaust duct or exhaust manifold. A direct injector is adapted to inject hydrogen fuel into the respective cylinder, i.e., in case of a plurality of cylinders, there is one direct injector for each cylinder. The direct injector is connected to a source of hydrogen fuel, normally a tank in which the hydrogen is stored either in gaseous form under high pressure or in liquid form.

The method comprises performing a plurality of hydrogen fuel injections before an ignition during an engine cycle, wherein a first injection, with a first injection amount and a first injection time as first injection parameters, is performed before the intake valve is closed and a second injection, with a second injection amount and a second injection time as second injection parameters, is performed by the direct injector after the intake valve has been closed and before an ignition is performed. The engine cycle corresponds to a 360° rotation of the crankshaft. During one engine cycle, air is drawn into the cylinder through the open intake valve and hydrogen is injected (directly and optionally also indirectly) into the cylinder, whereby a fuel-air mixture is formed. After the intake valve has been closed, an ignition is performed using a spark plug or the like, thus igniting the mixture and causing a combustion. It is understood that with each hydrogen fuel injection, hydrogen fuel—as defined above—is injected.

According to the inventive method, a first injection is performed before the intake valve is closed, i.e., during an intake phase of the engine cycle, before a compression phase. One could also say that the first injection is at least partially performed while the intake valve is open. This includes the possibility that the first injection is partially performed before the intake valve has been opened. While here and in the following reference is made to "injection times", "ignition time" etc., the respective times may also be represented by crank angles, i.e., the angular position of the crankshaft during the engine cycle. The first injection can be characterized by two first injection parameters, namely a first injection time, at which the first injection begins, and a first injection amount, which is the amount of hydrogen that is injected during the first injection. It is understood that the first injection time is before an ignition time and also before a closing time of the intake valve. It may, however, be (shortly) before an opening time of the intake valve. A second injection is performed after the intake valve has been closed, i.e., during a compression phase of the engine cycle. The second injection can be characterized by two second injection parameters, namely a second injection time, at which the second injection begins, and a second injection amount, which is the amount of hydrogen that is injected during the second injection. It is understood that the second injection time is before the ignition time but after the closing time of the intake valve. Accordingly, the entire amount of hydrogen is not injected by a single injection, but it is split up so that a portion (the first injection amount) is injected before the intake valve is closed, while another portion (the second injection amount) is injected after the intake valve is closed. The first injection occurs relatively early with respect to the ignition, wherefore fuel from the first injection has a relatively long time to mix with the air, which enhances the homogeneity of the fuel-air mixture. However, since only a portion of the total injection amount is injected at the first injection time, the fuel-air equivalence ratio (ER) is comparatively low, which increases the ignition energy. This is particularly important due to the early first injection time, during which surfaces of the engine are still relatively hot as a result of the combustion in the previous engine cycle and hot gases may reside inside the cylinder. Accordingly, the risk of a pre-ignition, i.e., an abnormal, spontaneous combustion that occurs before the ignition time, is reduced. This is important since the intake valve is open during the first injection (or at least a part thereof), wherefore there is a potential risk of backfire (i.e., an abnormal combustion that affects the intake duct), which risk is also mitigated. Although there is no general rule for the first injection amount, it is useful for many cases if the (average) ER resulting from the first injection is between 0.2 and 0.4 preferably between 0.25 and 0.35. The (average) ER resulting from the second injection can be considerably higher, e.g., between 0.6 and 0.8. Of course, a local ER may significantly differ from these values.

The second injection occurs relatively late with respect to the ignition, at a time when the temperatures of the engine surfaces and of the gases inside the cylinder can be expected to be lower than at the first injection time, which reduces the risk of a pre-ignition. Still, the second injection increases the total injection amount, thereby enhancing the amount of energy to be released from the subsequent combustion. Although the ER is increased by the second injection, this occurs relatively short before the ignition time, which also decreases the risk of a pre-ignition. It should also be noted that since the intake valve is closed at the second injection time, a possible pre-ignition caused by the second injection cannot lead to backfire. The inventive concept can also be referred to as a split injection, which has turned out to increase the safety and reliability of a hydrogen internal combustion engine without impairing its performance.

Even if the (first and second) injection parameters are carefully chosen based on theoretical and/or experimental knowledge, it is hardly possible to safely avoid any risk of pre-ignition under all circumstances with a set of fixed injection parameters, at least not without sacrificing engine performance in an unacceptable way. Therefore, according to the invention, the method further comprises performing an adjustment process that includes, if a pre-ignition is detected in one cylinder in one engine cycle, adjusting at least one injection parameter for a following engine cycle and/or for another cylinder. The adjustment allows to adapt the injection parameters with the objective to reduce or ideally eliminate the risk of pre-ignition in the following engine cycle or engine cycles. In case of several cylinders, it is also possible to adjust the at least one injection parameter for another cylinder. In this case, one does not have to wait for the next engine cycle, but the adjustment can be made in the same engine cycle. There are various strategies for adapting the at least one injection parameter, which will be discussed below. It is possible that the adjustment is performed after detecting a single pre-ignition, but it would also be possible to wait for a plurality of pre-ignitions, e.g., two or three, to occur before the adjustment is initiated. Generally, the adjustment may extend over a plurality of engine cycles, wherein one injection parameter is adjusted after a pre-ignition in a first engine cycle (and/or for a first cylinder), which adjustment may turn out to be insufficient since another pre-ignition occurs in the following engine cycle (and/or for a following cylinder) or one of the following engine cycles (and/or cylinders). This could then lead to another adjustment or possibly a series of adjustments, until no more pre-ignitions are detected.

The performance of the engine, in particular a torque generated by the engine, mainly depends on the total injection amount of fuel that is injected and burned in one engine cycle. The main objective of the adjustment process is to suppress pre-ignition, while maintaining engine output power and minimizing any effect on efficiency and exhaust emissions. It is therefore preferred that the at least one injection parameter is adjusted so that a total injection amount that is injected during one engine cycle is maintained constant. If the injection parameter is an injection time, it is understood that any adjustment does not change the total injection amount. If an adjustment is made to one of the injection amounts, the total injection amount is kept constant. So, if the first injection amount is reduced by some quantity, the second injection amount can be increased by the same quantity.

One possibility of an adjustment during the adjustment process is that the first injection time is delayed if a pre-ignition is detected before a threshold time, which threshold time is not before the second injection time. Delaying the first injection time of course means that the first injection time is moved to a later time during the engine cycle, i.e., closer to the ignition time and closer to the closing time of the intake valve. However, the first injection time will still be before said closing time. The threshold time could be identical to the second injection time but could also be delayed with respect to the second injection time by a (normally short) tolerance interval. If a pre-ignition is detected before the threshold time, this is interpreted as being a result of the first injection, not the second injection. Even after the second injection time, i.e., after the second injection has started, there is a short time interval during which the second injection has not had a substantial influence on the ER, and it is therefore unlikely that any pre-ignition during this time interval is caused by the second injection. This can be accounted for by delaying the threshold time with respect to the second injection time. If a pre-ignition is detected before the threshold time, the first injection time is delayed, thereby reducing the time interval between the first injection time and the ignition time. The temperatures in the engine are generally dropping until the next ignition, wherefore the delay leads to an injection into a cooler environment, thus reducing the pre-ignition risk.

Alternatively or additionally, the first injection amount can be decreased if a pre-ignition is detected before the threshold time. Again, such a pre-ignition can be assumed to be independent of the second injection. Reducing the first injection amount generally also reduces the ER before the second injection. This increases the ignition energy, wherefore a pre-ignition becomes less likely. If delaying the first injection time and reducing the first injection amount are both possible adjustment measures, there is generally no priority between these two measures. However, it would be possible to define some criteria as to when one of the measures should be used in favor of the other. For instance, if the first injection amount is above a predefined level, reducing the first injection amount could be preferred. If the first injection amount is below another predefined level, delaying the first injection time could be preferred. Correspondingly, delaying the first injection time could be preferred if the first injection time is before a certain point in time with respect to the ignition, while reducing the first injection amount could be preferred if the first injection time is after another point in time.

One embodiment provides that the second injection time is delayed if a pre-ignition is detected after the threshold time. In this case, the pre-ignition can hardly be attributed to the first injection but is most probably caused by the second injection. Accordingly, the second injection time is delayed and moved closer to the ignition time. The risk of the fuel-air mixture being ignited by hot surfaces or hot gases within the cylinder can therefore be reduced.

While all of the above-mentioned measures help to counteract pre-ignitions, they lead to a reduced homogeneity of the fuel-air mixture, which reduces the efficiency of the combustion and increases $NO_x$ emissions. Pre-ignitions severely affect engine performance and can damage the engine and/or the intake duct, wherefore the main objective of the adjustment process should be to avoid pre-ignitions. However, it is desirable to not excessively delay the injection times or reduce the first injection amount, thereby negatively affecting efficiency and emissions. According to one embodiment, the adjustment process includes, if at least no pre-ignition has been detected during at least one engine cycle, and an insufficient homogeneity of a fuel-air mixture is detected, advancing at least one injection time and/or increasing the first injection amount. "Advancing" means that the respective injection time is moved to an earlier time in the engine cycle, further ahead of the ignition time. Irrespective of whether the first injection time or the second injection time is advanced, this will lead to a more homogeneous mixture, although it may increase the risk of a pre-ignition. The same applies to an increase of the first injection amount. In order to avoid constant readjustments of the injection parameters, these measures should only be taken under at least one precondition, optionally several preconditions. One precondition is that no pre-ignition has been detected during at least one engine cycle, normally a plurality of engine cycles. This could be a large number of engine cycles like, e.g., at least 100 or at least 1000 cycles. This precondition ensures that already unstable combustion conditions are not further destabilized. This may be the only precondition, but there may be at least one additional precondition. One such additional precondition is that an insufficient homogeneity of the fuel-air mixture is detected. This has to be determined by some criteria which normally may not depend on the homogeneity as such, which is difficult to analyze and detect, but on effects of the insufficient homogeneity, mostly a composition of an exhaust gas. For instance, an increased amount of unburned hydrogen in the exhaust gas could be due to an inhomogeneous fuel-air mixture, as well as an increased amount of $NO_x$. Under these conditions, it is desirable to take measures for improving the homogeneity. In this context, the injection time could be advanced in smaller steps than in the delaying process. Likewise, the first injection amount could be increased in smaller steps than when it is decreased. This reduces the risk of entering into an injection parameter range where pre-ignitions occur.

As a rule, the tendency for pre-ignitions depends on various conditions, wherefore it is not possible to find one set of injection parameters that is suitable under all circumstances. It is therefore preferred that the injection parameters are selected depending on an operating point that is defined by a set of operating parameters of the engine. In other words, different values are selected for the injection parameters depending on the current operating point. The operating point is characterized by a plurality (or set) of operating parameters of the engine. Possible operating parameters that can be taken into account are an engine speed, an engine load, an intake manifold temperature and/or an $O_2$ partial pressure. The engine load can be expressed as an engine torque or an indicated mean effective pressure, both of which can be readily measured. The intake manifold temperature can be measured with a temperature sensor in the manifold or could be approximately determined by a temperature sensor near the manifold. The $O_2$ partial pressure can either be measured directly or indirectly, since it depends on the intake manifold pressure and, in the case of exhaust gas recirculation, the EGR rate.

It is conceivable to calculate any of the injection parameters according to a formula that may be a more or less accurate representation of the actual relation between the injection parameters and the operation parameters (e.g., engine speed, engine load etc.). However, in order to reduce the calculation effort, it is preferred that the injection parameters are determined from a lookup table. In such a lookup table, injection parameters can be stored in permanent (read-only) or, preferably, non-permanent form. The lookup table will not contain injection parameters for every possible set of operating parameters but only for a reasonable number of possible combinations. If the current operating parameters differ significantly from stored parameters, interpolation methods can be applied to calculate an approximate injection parameter. Alternatively, the closest operating parameter set in the lookup table can be used as an approximation. If, for instance, each operating point is defined by four operating parameters, the lookup table would have to be four-dimensional, which would make it exceedingly large and memory intensive. It has been found, though, that it is possible to use a plurality of lookup tables, e.g., two two-dimensional lookup tables instead of one four-dimensional lookup table, thereby splitting the dependency on the various operating parameters. In order to calculate the values for each injection parameter, the values from one lookup table could be added to the values from the other lookup table or could be multiplied by those values. Although this is an approximation, it has been found to yield reasonable results.

Preferably, the at least one lookup table is updated if at least one injection parameter is changed in the adjustment process. In other words, when it is found that the injection parameters from the lookup table are inadequate, thus leading to an adjustment, those values are updated in the lookup table. Such updates can be necessary for various reasons, e.g., due to drifting engine performance, which may be caused by flow changes within the injector or the engine, build-up of deposits, blow-by changes etc.

Preferably, the at least one lookup table is initialized by performing the adjustment process for a plurality of operating points until the injection parameters are stabilized for each operating point and storing the injection parameters for each operating point in the lookup table. Such an initialization can be performed at the factory before the engine (or a vehicle with the engine) is delivered to the customer. It is also possible that this initialization is performed for one engine of a certain type and then the data in the lookup table can be copied for other engines of the same type. The adjustment process should be performed for the entire range of realistic operating points. For each operating point, adjustments can be made until the injection parameters are stabilized, i.e., until no more adjustments to the injection parameters are necessary (e.g., no adjustments for a certain number of engine cycles).

According to one embodiment, the first injection is performed by a port injector that injects fuel upstream of the cylinder. The port injector normally injects the fuel into an intake port that is a part of or is directly connected to the intake manifold. This can be beneficial insofar as the temperatures near the port injector (e.g., in the intake port) may be considerably lower than in the cylinder, which reduces the pre-ignition risk.

Alternatively, the first injection maybe performed by the direct injector. This embodiment, the direct injector sequentially performs two injections, one before the intake valve is closed and the other after the intake valve is closed. This eliminates the need for an additional port injector.

There are various ways to detect a pre-ignition. For instance, the pre-ignition can be detected by at least one of a knock sensor, a crank speed sensor, and a spark plug ion sensor. The knock sensor is used to detect knocking (i.e., abnormal combustion after the ignition) and either measures the actual cylinder pressure, or, more commonly, measures mechanical vibrations of the cylinder. The crank speed sensor measures the current speed of the crankshaft, which may undergo sudden acceleration or deceleration if the cylinder pressure changes abruptly due to a pre-ignition. The spark plug ion sensor basically uses the current flowing in response to a voltage applied to the spark plug to identify increased ion concentrations, which may be due to a combustion inside the cylinder, e.g. caused by a pre-ignition.

The invention also provides an engine system with an hydrogen internal combustion engine having at least one cylinder with an intake valve and a direct injector for injecting hydrogen fuel directly into the cylinder and an engine control unit configured to control the engine to perform a plurality of hydrogen fuel injections before an ignition during an engine cycle so that a first injection, with a first injection amount and a first injection time as first injection parameters, is performed before the intake valve is closed and a second injection, with a second injection amount and a second injection time as second injection parameters, is performed by the direct injector after the intake valve has been closed and before an ignition is performed, the engine control unit further being configured to perform an adjustment process that includes, if a pre-ignition is detected in one cylinder in one engine cycle, adjusting at least one injection parameter for a following engine cycle and/or for another cylinder.

The engine control unit is at least connected to the direct injector and—where present—the port injector to control the injections. Furthermore, it will be connected to of the above-mentioned sensors. It may also comprise a memory where the above-mentioned lookup table can be stored. The engine control unit may at least partially be software-implemented. All other terms have already been explained above with respect to the inventive method and therefore will not be explained again. Preferred embodiments of the inventive engine system correspond to those of the inventive method.

BRIEF DESCRIPTION OF THE DRAWINGS

Preferred embodiments of the invention will now be described, by way of example, with reference to the accompanying drawings, in which.

DESCRIPTION OF PREFERRED EMBODIMENTS

Figure 1:
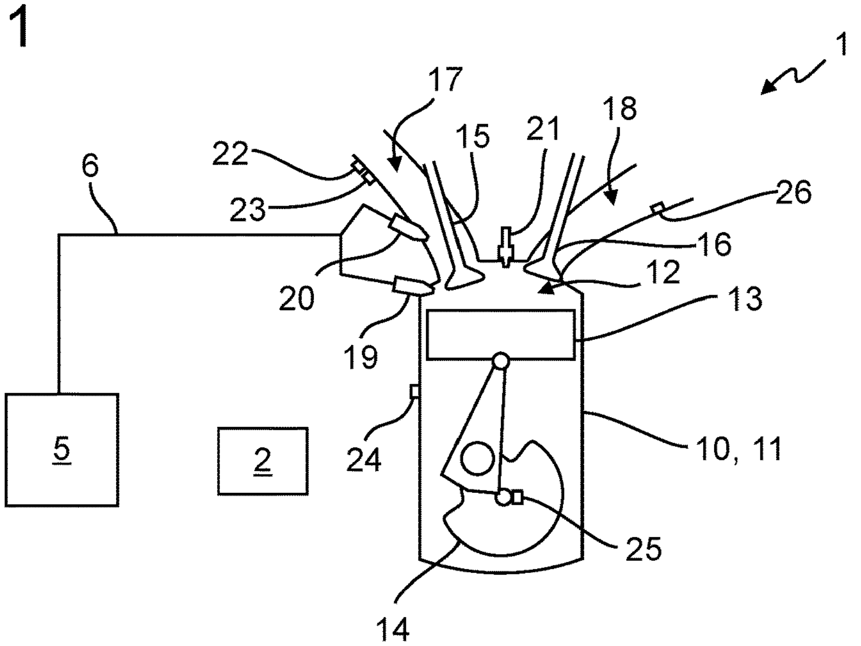
FIG. 1 is a schematic view of an inventive engine system with an hydrogen internal combustion engine.
Figure 4:
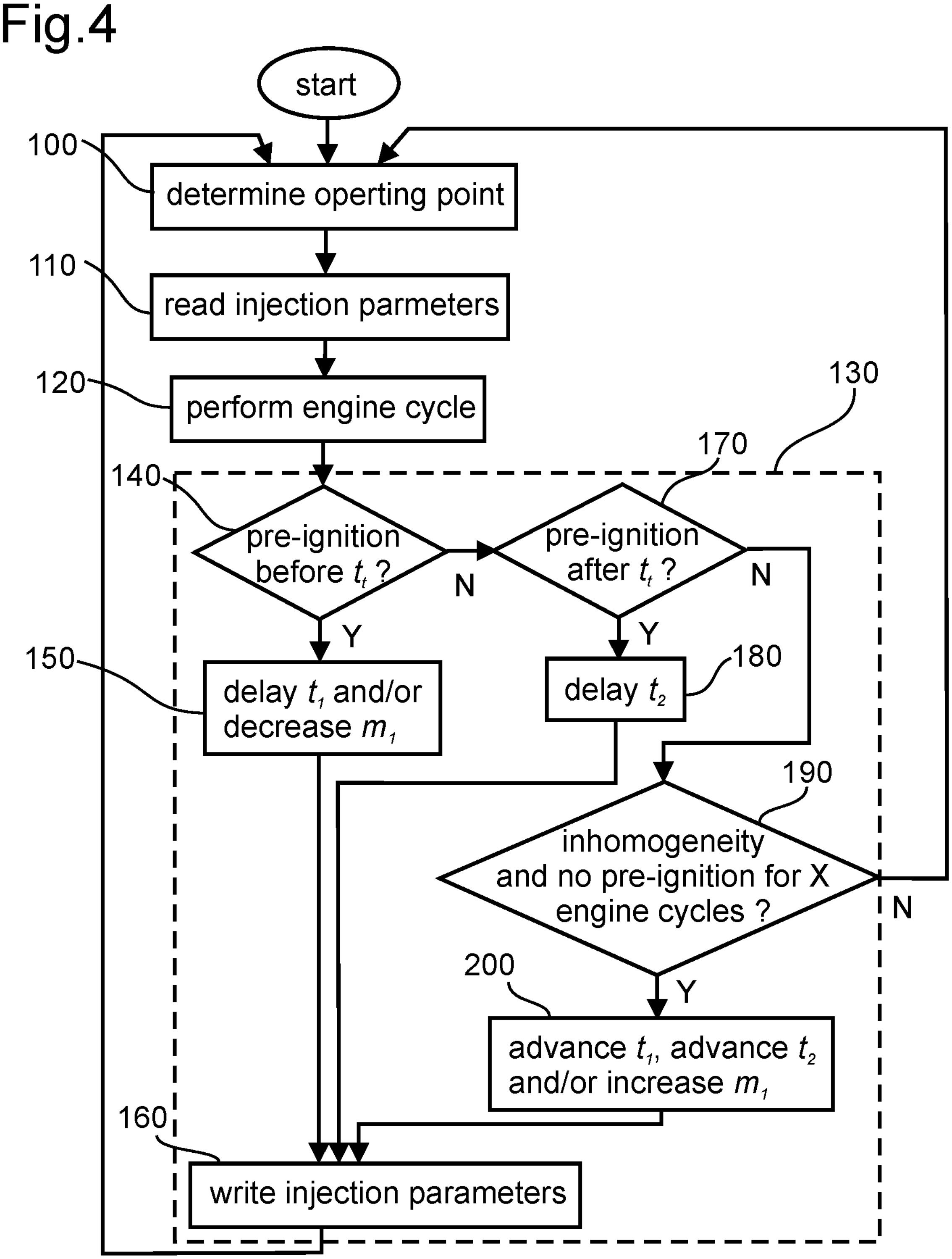
FIG. 4 is a flowchart of an inventive method.

FIG. 1 shows a schematic view of an inventive engine system 1 which comprises a hydrogen internal combustion engine 10 of a car. It will be understood that the engine 10 normally has a plurality of cylinders 11, of which only one is shown in this drawing. A combustion chamber 12 of the cylinder 11 is connected to an intake port 17 and an exhaust port 18, each of which can be temporarily isolated from the combustion chamber 12 by an intake valve 15 or exhaust valve 16, respectively. A piston 13 is movably disposed inside the cylinder 13 and is connected to a crankshaft 14. A direct injector 19 is disposed to inject hydrogen fuel, which comprises at least 98% of hydrogen in elementary form, directly into the combustion chamber 12 of the cylinder 11, while a port injector is disposed to inject the fuel into the intake port 17. Both injectors 19, 20 are connected via a fuel line 6 to a hydrogen tank 5, where hydrogen may be stored under high pressure in gaseous form or alternatively in liquid form at low temperature. A spark plug 21 is disposed at the top of the combustion chamber 12. A pressure sensor 22 and a temperature sensor 23 are disposed on or inside the intake duct 17. A knock sensor 24 is disposed on the cylinder 11 while a crank speed sensor 25 is disposed next to the crankshaft. An NOx sensor 26 is disposed inside the exhaust port 18. It will be understood that the depiction of the entire system 1 and especially of the sensors 22-26 is schematic and does not represent actual sizes, shapes or positions. An engine control unit 2 is connected to the injectors 19, 20, to the spark plug 21 and to the sensors 22-26. It is adapted to control the injectors 19, 20 and the spark plug 21 during inventive method for operating the engine 10, which will now be explained with reference to the diagram in FIG. 2 and the flowchart in FIG. 4.

In a first step, at 100, the engine control unit 2 determines the operating point, which is characterized by an engine speed, an engine load, an intake air temperature measured by the temperature sensor 23 and an $O_2$ partial pressure, which can be derived from the intake air pressure measured by the pressure sensor 22, an EGR rate (if applicable) and the air-fuel ratio of the engine 10. Then, at 110, injection parameters are read from a lookup table that relates the injection parameters to the operating parameters. In this context, "reading" also includes minor calculations in addition to the reading process as such, e.g., interpolating or combining values from two or more lookup tables by adding and/or multiplying etc. The injection parameters include as first injection parameters a first injection time $t_1$ and a first injection amount $m_1$, and as second injection parameters a second injection time $t_2$ and a second injection amount $m_2$.

While reference is made to “time”, the respective parameter could also refer to a crank angle, which corresponds to a time during the engine cycle.

Figure 2:
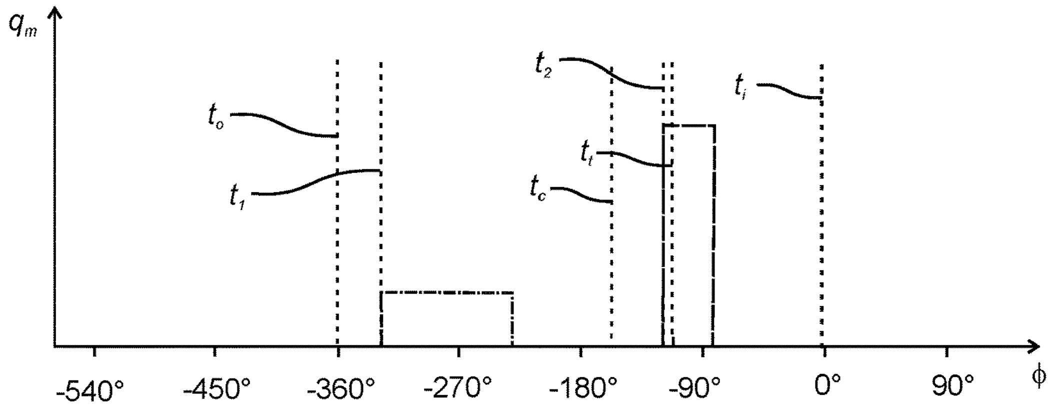
FIG. 2 is a diagram illustrating the timing of processes in the engine system of FIG. 1.

Then, the engine cycle is performed at 120. After an exhaust phase, the intake valve 15 is opened at an opening time to, so that air is taken in through the intake port 17 into the combustion chamber 12, as can be seen in FIG. 2, which relates the mass flow $q_m$ through the injectors 19, 20 2 the crank angle ϕ. As indicated by the dashed-dotted line, a first injection by the port injector 20 is caused, starting at a first injection time $t_1$ after the opening time to. Hydrogen fuel is injected into the intake port 17, where it mixes with air to form a fuel-air mixture that enters the cylinder 11 after the intake valve 15 has been opened. The first injection continues well into an intake phase during which air is taken in through the intake port 17. Some time after the first injection has ended, a second injection by the direct injector 19 is caused at a second injection time $t_2$, as indicated by the long-dashed line. In this example, the first injection takes longer but has a lower mass flow $q_m$ than the second injection. Then, sometime after the second injection has ended, an ignition by the spark plug 21 is caused at an ignition time $t_i$. During the engine cycle, it is possible that some kind of pre-ignition occurs, i.e., any kind of ignition not caused by the spark plug 21 and thus occurring before the ignition time $t_i$. This can be detected by the engine control unit 2 using the spark plug 21 as an ion sensor, the knock sensor 24 and/or the crank speed sensor 25.

After the engine cycle has been completed, the method enters an adjustment process 130. At 140, it is checked whether a pre-ignition has occurred before a threshold time $t_r$ that is shortly after the second injection time $t_2$. Any such pre-ignition can be attributed to the first injection and if detected, this causes the engine control unit 2 to adjust at least one first injection parameter, namely by delaying the first injection time $t_1$ and/or decreasing the first injection amount $m_1$. If the first injection amount $m_1$ is decreased, the second injection amount $m_2$ is increased at the same time so that a total injection amount is maintained constant. These updated injection parameters are then written at 160 into the lookup table before the method returns to 100.

If no preignition has been detected before $t_r$, it is checked at 170 whether such pre-ignition has occurred after $t_r$. If so, the pre-ignition can be attributed to the second injection and as a result, the second injection time $t_2$ is delayed at step 180 before the updated injection parameters are recorded at 160 and the method returns to 100.

If no pre-ignition has been detected, it is checked at 190 whether there is an indication of an inhomogeneous, i.e., of an insufficiently homogeneous fuel-air mixture, which can be determined by the amount of nitrous gases detected by the $NO_x$ sensor 26. If so, it is further checked if no pre-ignition has been detected for a certain number of engine cycles, which indicates that the present injection parameters are safe with regard to pre-ignitions, although inadequate for providing a homogeneous fuel-air mixture. If not, the method returns to 100. If both conditions at 190 are true, measures are taken at 200 to improve the homogeneity of the fuel-air mixture. It is possible to advance the first injection time $t_1$, advance the second injection time $t_2$ and/or increase the first injection amount $m_1$ (while also maintaining the total injection amount). It should be noted that both the advancement of the injection times $t_1$, $t_2$ and the increase of the first injection amount $m_1$ will usually be limited within this adaptive algorithm. In other words, advancing and/or increasing can only be performed within predefined limits. This limitation reduces the risk of running into a parameter range that is likely to cause pre-ignitions.

Figure 3:
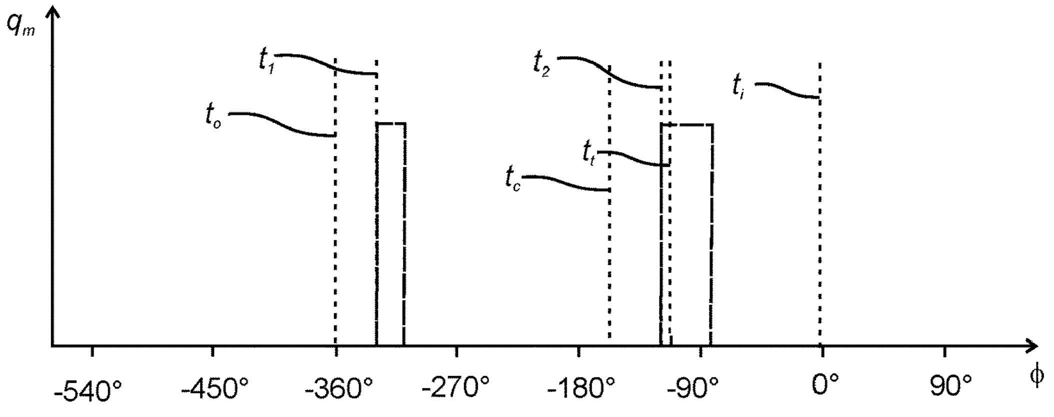
FIG. 3 is a diagram illustrating the timing of processes in an alternative engine system.

FIG. 3 illustrates processes similar to FIG. 2 for an alternative engine system that does not employ a port injector. In this case, the first injection and the second injection are performed by the direct injector 19. In this case, the first injection time $t_1$ is also after the opening time to, the first injection lasts shorter than in FIG. 2 as it is likely to have a higher mass flow, wherefore the same first injection amount $m_1$ can be provided as in FIG. 2.

While the method described above can be performed during normal operation of the engine 10 in the vehicle, it can also be used for initializing the lookup table at the factory. The adjustment process 130 should be performed for the entire range of realistic operating points. For each operating point, adjustments can be made until the injection parameters are stabilized, i.e., until no more adjustments to the injection parameters are necessary. It is also possible that this initialization is performed for one engine 10 of a certain type and then the data in the lookup table can be copied for other engines 10 of the same type.

| Legend of Reference Numbers: | |
|---|---|
| 1 | engine system |
| 2 | engine control unit |
| 5 | hydrogen tank |
| 6 | fuel line |
| 10 | engine |
| 11 | cylinder |
| 12 | combustion chamber |
| 13 | piston |
| 14 | crankshaft |
| 15 | intake valve |
| 16 | exhaust valve |
| 17 | intake port |
| 18 | exhaust port |
| 19 | direct injector |
| 20 | port injector |
| 21 | spark plug |
| 22 | pressure sensor |
| 23 | temperature sensor |
| 24 | knock sensor |
| 25 | crank speed sensor |
| 26 | NOx sensor |

The invention claimed is:

1. A method of operating a hydrogen internal combustion engine which is adapted to burn hydrogen fuel with oxygen to generate mechanical energy, the hydrogen internal combustion engine having at least one cylinder with an intake valve and a direct injector for injecting the hydrogen fuel directly into the cylinder, which hydrogen fuel is a gaseous fuel that comprises at least 90% of hydrogen in elementary form, wherein the method comprises performing a plurality of hydrogen fuel injections before an ignition during an engine cycle, wherein a first injection, with a first injection amount $m_1$ and a first injection time $t_1$ as first injection parameters, is performed before the intake valve is closed and a second injection, with a second injection amount $m_2$ and a second injection time $t_2$ as second injection parameters, is performed by the direct injector after the intake valve has been closed and before an ignition is performed, the method further comprising performing an adjustment process that includes, if a pre-ignition is detected in one cylinder in one engine cycle, adjusting at least one injection parameter, which is one of said first and second injection parameters, for a following engine cycle and/or for another cylinder, wherein the at least one injection parameter is adjusted so that a total injection amount that is injected during one engine cycle is maintained constant.

2. The method according to claim 1, wherein the first injection time $t_1$ is delayed if a pre-ignition is detected before a threshold time $t_r$, which threshold time is not before the second injection time $t_2$.

3. The method according to claim 2, wherein the first injection amount $m_1$ is decreased if a pre-ignition is detected before the threshold time $t_r$.

4. The method according to claim 2, wherein the second injection time $t_2$ is delayed if a pre-ignition is detected after the threshold time $t_r$.

5. The method according to claim 1, wherein the adjustment process includes, if at least no pre-ignition has been detected during at least one engine cycle, advancing at least one injection time and/or increasing the first injection amount $m_1$.

6. The method according to claim 1, wherein the injection parameters are selected depending on an operating point that is defined by a set of operating parameters of the engine.

7. The method according to claim 1, wherein the injection parameters are determined from at least one lookup table.

8. The method according to claim 7, wherein the at least one lookup table is updated if at least one injection parameter is changed in the adjustment process.

9. The method according to claim 7, wherein the at least one lookup table is initialized by performing the adjustment process for a plurality of operating points until the injection parameters are stabilized for each operating point and storing the injection parameters for each operating point in the lookup table.

10. The method according to claim 1, wherein the first injection is performed by a port injector that injects fuel upstream of the cylinder.

11. The method according to claim 1, wherein the first injection is performed by the direct injector.

12. The method according to claim 1, wherein a pre-ignition is detected by at least one of a knock sensor, a crank speed sensor, or a spark plug ion sensor.

13. An engine system with an hydrogen internal combustion engine which is adapted to burn hydrogen fuel with oxygen to generate mechanical energy, which hydrogen fuel is a gaseous fuel that comprises at least 90% of hydrogen in elementary form, the engine having at least one cylinder with an intake valve and a direct injector for injecting hydrogen fuel directly into the cylinder and an engine control unit configured to control the engine to perform a plurality of hydrogen fuel injections before an ignition during an engine cycle so that a first injection, with a first injection amount $m_1$ and a first injection time $t_1$ as first injection parameters, is performed before the intake valve is closed and a second injection, with a second injection amount $m_2$ and a second injection time $t_2$ as second injection parameters, is performed by the direct injector after the intake valve has been closed and before an ignition is performed, the engine control unit further being configured to perform an adjustment process that includes, if a pre-ignition is detected in one cylinder in one engine cycle, adjusting at least one injection parameter, which is one of said first and second injection parameters, for a following engine cycle and/or for another cylinder, wherein the at least one injection parameter is adjusted so that a total injection amount that is injected during one engine cycle is maintained constant.

* * * * *